United States Patent [19]
Helmlinger et al.

[11] 3,883,572
[45] May 13, 1975

[54] NOVEL MERCAPTODERIVATIVES OF IONONES AND IRONES

[75] Inventors: Daniel Helmlinger, Dubendorf; Dietmar Lamparsky, Wangen-Dubendorf; Peter Schudel, Grut; Trudi Sigg-Grütter, Winterthur; Jost Wild, Zurich, all of Switzerland

[73] Assignee: Givaudan Corporation, Clifton, N.J.

[22] Filed: Mar. 29, 1974

[21] Appl. No.: 456,341

Related U.S. Application Data

[62] Division of Ser. No. 203,112, Nov. 26, 1971, Pat. No. 3,845,134.

[52] U.S. Cl............ 260/455 R; 260/586 R; 426/175
[51] Int. Cl............................................ C07c 153/01
[58] Field of Search ................................ 260/455 R

[56] References Cited
FOREIGN PATENTS OR APPLICATIONS

| | | | |
|---|---|---|---|
| 531,313 | 1/1973 | Switzerland...................... | 260/455 R |
| 531,559 | 1/1973 | Switzerland...................... | 260/455 R |
| 2,159,924 | 5/1972 | Germany.......................... | 260/455 R |

*Primary Examiner*—Lewis Gotts
*Assistant Examiner*—D. R. Phillips
*Attorney, Agent, or Firm*—Thomas Cifelli, Jr.

[57] ABSTRACT

There are disclosed novel mercapto and acetyl mercapto derivatives of ionones and irones. These compounds possess interesting properties as odorants and flavorants. The nature of these odorant and flavorant properties is drastically modified when they are compounded with ionones or irones.

2 Claims, No Drawings

NOVEL MERCAPTODERIVATIVES OF IONONES AND IRONES

This is a division of application Ser. No. 203,112, filed Nov. 26, 1971, now U.S. Pat. No. 3,845,134.

FIELD OF THE INVENTION

Novel sulfur containing ionone and irone derivatives.

SUMMARY OF THE INVENTION

The ionone and irone derivatives provided by the present invention have the following general formula

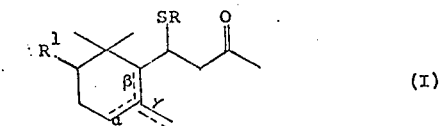

wherein R represents a hydrogen atom or the acetyl group and $R^1$ represents a hydrogen atom or the methyl group and wherein the broken lines denote a double bond which is present in one of the three indicated positions, namely in the position corresponding to $\alpha$-, $\beta$- or $\gamma$-ionone or -irone.

According to the process provided by the present invention, the ionone and irone derivatives of formula I hereinbefore are manufactured by adding a compound of the general formula

HSR (III)

wherein R has the significance given earlier, to the double bond situated in the side-chain of a compound of formula II hereinbelow

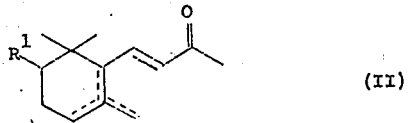

wherein $R_1$ and the broken lines are as defined hereinabove.

Or, for the manufacture of a derivative of formula I in which R represents a hydrogen atom, cleaving off the acetyl group from a corresponding derivative of formula I in which R represents the acetyl group.

The ionone and irone derivatives of formula I hereinbefore are distinguished by particular fragrance and/or flavor properties on the basis of which they can be used in odorant and/or flavoring compositions, especially those with berry and/or floral notes.

On the basis of their interesting aroma properties, the certain derivatives can be used for generating raspberry aromas in foodstuffs (e.g. milk drinks, yoghurt etc.), in delicacies (e.g. confectionery products such as bonbons) and in beverages (e.g. table water, mineral water etc.). Their pronounced aromatic qualities enable them to be used in small concentrations (e.g. in the range of 0.1 ppm–1 wt. percent, preferably in the range of 10–500 ppm).

DESCRIPTION OF THE PREFERRED EMBODIMENTS

Derivatives of the general formula

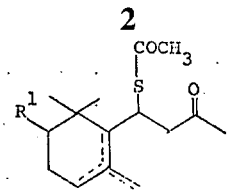

wherein $R^1$ and the broken lines have the significance given in connection with formula I hereinbefore, can be manufactured by reacting a compound of formula II with thioacetic acid, expediently in the presence of a catalyst favoring the formation of radicals. Such catalysts are, for example, azodiisobutyronitrile, ascaridol or customary peroxides. However, the reaction can also be initiated by the action of rays of the ultraviolet or visible range. The reaction temperature expediently lies between about 0° and 150°C, preferably between about 100°C and 130°C.

Derivatives of the general formula

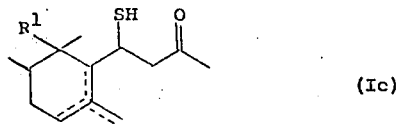

wherein $R^1$ and the broken lines have the significance given in connection with formula I hereinbefore, can, as mentioned earlier, be manufactured either by (a) reacting a compound of formula II with hydrogen sulphide or by (b) cleaving off the acetyl group from a derivative of formula Ib, expediently under acidic or mild alkaline conditions.

The reaction of a compound of formula II with hydrogen sulphide is expediently effected in the presence of a base such as an alkali metal hydroxide (e.g. sodium hydroxide or potassium hydroxide), an alkaline earth metal hydroxide (e.g. calcium hydroxide) or an organic base such as an amine (e.g. a dialkylamine such as diethyl amine, a trialkylamine such as triethylamine or a heterocyclic amine such as piperidine). A solvent there can be used, for example, ethanol. The reaction can be carried out at a temperature between about 0° and 100°C. Temperatures in the range of about 40°–60°C. are preferred. In other respects, the reaction can be carried out under normal pressure or expediently under elevated pressure, i.e. in a sealed vessel, since the reaction proceeds with diminution of volume.

The acid cleavage of the acetyl group from a derivative of formula Ib is expediently carried out in the presence of a Lewis acid such as boron trifluoride or boron trichloride. As the solvent there can be used, for example, methanol or ether. This cleavage can be carried out at a temperature between about −20° and 100°C., preferably between 10° and 50°C. The pressure is not critical, but for the sake of convenience it is preferred to carry out this cleavage under normal pressure. The acetyl group can also be cleaved off from a derivative of formula Ib under mild alkaline conditions. Suitable bases for this purpose are alkali metal hydroxides (e.g. sodium hydroxide or potassium hydroxide), alkaline earth metal hydroxides (e.g. calcium hydroxide), alkali metal carbonates (e.g. sodium carbonate), alkali metal bicarbonates (e.g. sodium bicarbonate) and the like. As the solvent there can be used lower alkanols such as methanol or ethanol, water or mixtures thereof. This alkaline cleavage can be carried out at a temperature between about 0° and 100°C., preferably between 40° and 60°C. The pressure is not a critical factor, but it is, however, preferred to carry out this alkaline cleavage under normal pressure.

The aforementioned cleavage of the acetyl group from a derivative of formula Ib proceeds non-quantitatively under both the acidic and the alkaline conditions and yields, in addition to starting material and the desired product, the corresponding compound of formula II.

A particular embodiment of the present invention is concerned with ionone derivatives of the general formula

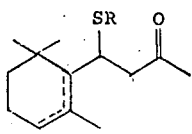

(Ia)

wherein R has the significance given earlier and the broken lines denote a double bond which is present in one of the two indicated positions.

Of particular interest are the fragrance and flavor qualities which the ionone and irone derivatives of formula I develop in combination with a compound of the general formula

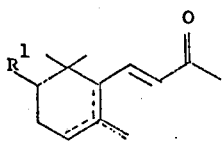

(II)

wherein $R^1$ has the significance given earlier and the broken lines denote a double bond which is present in one of the three indicated positions, especially those ionone derivatives of formula Ia in combination with a compound of the general formula

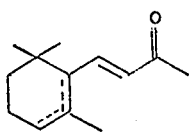

(IIa)

wherein the broken lines denote a double bond which is present in one of the two indicated positions.

It will be appreciated that in the combination of an ionone or irone derivative of formula I on the one hand with a compound of formula II on the other hand the significance of $R^1$ and/or the position of the double bond denoted by the broken lines need not be identical.

In accordance with the present invention it has been surprisingly found, for example, that mixtures of α-ionone (a) with 4-(1,1,3-trimethyl-3-cyclohexen-2-yl)-4-acetyl-mercapto-butanone-2 (b) and/or particularly with 4-(1,1,3-trimethyl-3-cyclohexen-2-yl)-4-mercapto-butanone-2 (c) have a pronounced raspberry aroma, that is to say, the aroma of freshly pressed raspberries. This finding is completely unexpected insofar as the odor of α- and β-ionone can hardly be denoted as raspberry-like and, above all, the fragrances of the two individual components (b) and (c) are in no way reminiscent of raspberries, as can be seen from the following fragrance characterization: Acetylmercapto derivative (b): Sulphur-like, reminiscent of leeks, slightly woody. Mercapto derivative (c): Green, sulphurous with a woody under-tone.

The odor of raspberries occurs with mixtures of the most varied composition. Practical mixtures a+b, a+c or a+b+c in percentages by weight (preferred values in brackets) are given in the following Table:

Table

| Mixture | Percentage by weight | | |
|---|---|---|---|
| | a | b | c |
| a+b | 80–99.9 (95–99) | 0.1–20 (1–5) | |
| a+c | 90–99.9 (98–99) | | 0.1–10 (1–2) |
| a+b+c | 20–99.8 (80–85) | 0.1–40 (1–5) | 0.1–60 (19–25) |

For the olfactory evaluation of these mixtures there were used 10 percent solutions in ethanol (fragrance test) or aqueous sugar solutions containing 0.1 ml of the fragrance test solution per 100 ml of sugar solution (flavor test).

However, the ionone and irone derivatives of formula I hereinbefore also possess advantageous properties in compositions of quite different character (e.g. in compositions with floral note) since they are capable of modifying the fragrance of such compositions in a desirable manner. They can accordingly also be used as odorants for the production of perfumes, especially those with woody and floral notes. For this purpose, they can be used in an amount in the range of about 0.001–5 wt. percent, preferably about 0.01–1 wt. percent. In addition to actual perfumes, such odorant compositions can also be used as bases for the perfuming of products such as solid and liquid detergents, synthetic washing agents, aerosols and cosmetic articles of all kinds (e.g. soaps, lotions, creams etc). In addition, the ionone and irone derivatives of formula I are also distinguished by superior adhesiveness.

The following Examples illustrate the process provided by the present invention:

EXAMPLE 1

50 g of α-ionone are dissolved in 50 ml of thioacetic acid and treated with 250 mg of azodiisobutyronitrile. The mixture is heated at 115°C under reflux for 18 hours, subsequently cooled in ice-water and taken up in 4 litres of ether. The ethereal solution is washed once with 250 ml of saturated aqueous sodium chloride solution, then twice with 250 ml of saturated aqueous sodium bicarbonate solution each time and a further three times with 250 ml of saturated aqueous sodium chloride solution each time. The organic phase is dried over magnesium sulphate and the ether distilled off under a vacuum. There results a crude product (91 g) which is fractionally distilled at 0.1 mm Hg. The fractions free from α-ionone are combined and crystallized from hexane at −70°C. There are obtained 33.5 g of 4-(1,1,3-trimethyl-3-cyclohexen-2-yl)-4-acetylmercapto-butanone-2 of melting point 57°–58°C and boiling point 140°C/0.1 mm Hg, in the form of two diastereomers in the ratio 1:1.

Fragrance of the product: sulphur-like, reminiscent of leeks, base slightly woody.

EXAMPLE 2

48 g of α-ionone are treated with a solution of 4 g of potassium hydroxide in 40 ml of absolute ethanol and cooled to −75°C. At this temperature, 40 ml of hydrogen sulphide are condensed in over the course of 1 hour. The reaction solution is rapidly transferred into a pre-cooled autoclave and allowed to stand at room temperature for 20 hours, the pressure rising to 20 atmospheres. During 2 hours, the autoclave is heated to 50°C (internal temperature), whereby the pressure increases to 28 atmospheres. It is subsequently cooled to 10°C, the excess hydrogen sulphide evaporated off and the residual reaction mixture taken up in 3 litres of ether. The ethereal solution is washed four times with 250 ml of saturated aqueous sodium chloride solution each time and then dried over anhydrous magnesium sulphate. After distillation of the ether under a vacuum, there remains a crude product (51.5 g) which, according to gas-chromatographic analysis, consists of 33 percent α-ionone and 67 percent 4-(1,1,3-trimethyl-3-cyclohexen-2-yl)-4-mercapto-butanone-2 (in the form of two diastereomers in the ratio 12:1). The crude product is fractionally distilled over 1 g of BHT (2,5-di-t-butyl-p-cresol), whereby there are obtained 38 g of 4-(1,1,3-trimethyl-3-cyclohexen-2-yl)-4-mercapto-butanone-2 of boiling point 80°C/0.07 mm Hg.

Fragrance of the product: Green, sulphurous with a woody under-tone in the direction of ionone. After 18 hours, vitamin B odour with ionone-like accent.

EXAMPLE 3

100 g of β-ionone are dissolved in 100 ml of thioacetic acid and treated with 250 mg of azodiisobutyronitrile. The mixture is heated at 115°C under reflux for 20 hours, subsequently cooled in ice-water and taken up in 4 litres of ether. The ethereal solution is washed once with 250 ml of saturated aqueous sodium chloride solution, then twice with 250 ml of saturated aqueous sodium bicarbonate solution each time and a further three times with 250 ml of saturated aqueous sodium chloride solution each time. The organic phase is dried over magnesium sulphate and the ether distilled off under a vacuum. There results a crude product (131 g) which is fractionally distilled at 0.1 mm Hg. The fractions containing the desired product are combined and crystallized from hexane at −70°C. There are thus obtained 71.5 g of 4-(1,1,3-trimethyl-2-cyclohexen-2-yl)-4-acetylmercapto-butanone-2 of melting point 31°–33°C and boiling point 112°C/0.1 mm Hg.

EXAMPLE 4

1 g of 4-(1,1,3-trimethyl-3-cyclohexen-2-yl)-4-acetylmercapto-butanone-2 is dissolved in 10 ml of saturated aqueous sodium bicarbonate solution. The solution is heated at 50°C for 1 hour, subsequently cooled in ice-water and taken up in 200 ml of ether. the ethereal solution is washed three times with 50 ml of saturated aqueous sodium chloride solution each time, dried over anhydrous magnesium sulphate and the ether is distilled off under a vacuum. According to gas-chromatographic analysis the product (0.91 g) has the following composition:

| | |
|---|---|
| 4-(1,1,3-trimethyl-3-cyclohexen-2-yl)--4-acetylmercapto-butanone-2: | 81% |
| 4-(1,1,3-trimethyl-3-cyclohexen-2-yl)--4-mercapto-butanone-2: | 5% |
| α-ionone: | 14% |

EXAMPLE 5

A solution of 1 g of boron trifluoride in 10 ml of methanol is treated under a nitrogen atmosphere with 2 g of 4-(1,1,3-trimethyl-3-cyclohexen-2-yl)-4-acetylmercapto-butanone-2 and the mixture is stirred at 20°C for 17.5 hours. Subsequently, 20 ml of ether and 50 ml of water are added and the emulsion obtained is taken up in 500 ml of ether. The ethereal solution is washed five times with 50 ml of water each time, dried over magnesium sulphate and concentrated in a vacuum at 45°C. There results a crude product (1.83 g) which, according to gas-chromatographic analysis, contains 26 percent of 4-(1,1,3-trimethyl-3-cyclohexen-2-yl)-4-mercapto-butanone-2. This can be separated from starting material which is still present according to usual methods.

EXAMPLE 6

20.6 of β-irone are treated with a solution of 1.6 g of potassium hydroxide in 16 ml of absolute ethanol and cooled to −75°C. At this temperature, 40 ml of hydrogen sulphide are condensed in over the course of 1 hour. The reaction solution is rapidly transferred into a pre-cooled autoclave and allowed to stand at room temperature for 1 hour. During 2 hours, the autoclave is heated to 50°C (internal temperature), whereby the pressure increases to 21 atmospheres. It is subsequently cooled to 10°C, the excess hydrogen sulphide evaporated off and the residual reaction mixture taken up in 3 litres of ether. The ethereal solution is washed four times with 250 ml of saturated aqueous sodium chloride solution each time and then dried over anhydrous magnesium sulphate. After distillation of the ether under a vacuum, there remains a crude product (19.9 g) which, according to gas-chromatographic analysis, consists of 39 percent β-irone and 61 percent 4-(1,1,3,6-tetramethyl-2-cyclohexen-2-yl)-4-mercapto-butanone-2. The crude product is fractionally distilled, whereby there are obtained 9.75 g of 4-(1,1,3,6-tetramethyl-2-cyclohexen-2-yl)-4-mercapto-butanone-2 of boiling point 102°C/0,1 mm Hg and of 96 percent purity.

EXAMPLE 7

1 g of γ-ionone are dissolved in 2 ml of thioacetic acid and treated with 10 mg of azodiisobutyronitrile. The mixture is heated at 95°C for 2 hours. The mixture is fractionally distilled at 0.01 mm Hg. There are obtained 530 mg of 4-(1,1-dimethyl-3-methylene-cyclohex-2-yl)-4-acetyl-mercaptobutanone-2 of boiling point 115°C/0.01 mm Hg (bulb-tube distillation).

EXAMPLE 8

1.6 g of γ-ionone are treated with a solution of 0.5 g of potassium hydroxide in 5 ml of absolute ethanol and cooled to −75°C. At this temperature, 40 ml of hydrogen sulphide are condensed in over the course of 1 hour. The reaction solution is rapidly transferred into a pre-cooled autoclave and heated to 50°C (internal temperature), whereby the pressure increases to 23 atmospheres. It is subsequently cooled to 10°C, the excess hydrogen sulphide evaporated off and the residual reaction mixture taken up in 1 litre of ether. The ethereal solution is washed four times with 50 ml of saturated aqueous sodium chloride solution each time and then dried over anhydrous magnesium sulphate. After distillation of the ether under a vacuum, there remains a crude product (1.75 g) which, according to gas-chromatographic analysis, consists of 48 percent α-ionone and 52 percent 4-(1,1-dimethyl-3-methylene-cyclohex-2-yl)-4-mercapto-butanone-2 (in the form of two diastereomers in the ratio 10:1). The crude product is fractionally distilled, whereby there are obtained 250 mg of 4-(1,1-dimethyl-3-methylene-cyclohex-2-yl)-4-mercapto-butanone-2 of boiling point 95°C/0.02 mm Hg (bulb-tube distillation).

The following Examples illustrate odorant and/or flavouring compositions containing the ionone and irone derivatives provided by the invention:

EXAMPLE A

To a raspberry aroma composition consisting of

| | parts by weight |
|---|---|
| α-irone | 20 |
| vanillin | 200 |
| p-hydroxyphenyl-butan-2-one (raspberry ketone) | 500 |
| maltol | 200 |
| formic acid | 150 |
| acetic acid | 150 |
| acetic acid butyl ester | 1 |
| acetic acid ethyl ester | 0.5 |
| dimethyl sulphide | 1 |
| benzyl alcohol | 200 |
| menthone | 1 |
| C—14 aldehyde | 10 |
| C—16 aldehyde | 35 |
| raspberry distillate | 200 |
| isobutyric acid maltyl ester | 40 |
| anthranilic acid methyl ester | 0.5 |
| tiglic acid benzyl ester | 0.5 |
| there are added: | |
| 4-(1,1,3-trimethyl-3-cyclohexene-2-yl)-4-mercapto-butanone-2 | 1.84 |
| 4-(1,1,3-trimethyl-3-cyclohexen-2-yl)-4-acetyl-mercapto-butanone-2 | 0.16 |
| α-ionone | 200 |

This addition results in a marked improvement of the aroma in that the natural note of fresh raspberries is imparted to the composition.

EXAMPLE B

To a raspberry aroma composition consisting of

| | parts by weight |
|---|---|
| α-irone | 20 |
| vanillin | 200 |
| p-hydroxyphenyl-butan-2-one | 500 |
| maltol | 200 |
| formic acid | 150 |
| acetic acid | 150 |
| acetic acid butyl ester | 1 |
| acetic acid ethyl ester | 0.5 |
| dimethyl sulphide | 1 |
| benzyl alcohol | 200 |
| menthone | 1 |
| C—14 aldehyde | 10 |
| C—16 aldehyde | 35 |
| raspberry distillate | 200 |
| isobutyric acid maltyl ester | 40 |
| anthranilic acid methyl ester | 0.5 |
| tiglic acid benzyl ester | 0.5 | there is added one of the following mixtures:

-Continued

| | parts by weight |
|---|---|
| 1) α-ionone | 195 |
| 4-(1,1,3-trimethyl-3-cyclohexen-2-yl)-4-acetylmercapto-butanone-2 | 7 |
| 2) α-ionone | 200 |
| 4-(1,1,3-trimethyl-3-cyclohexen-2-yl)-4-mercapto-butanone-2 | 2 |
| 3) α-ionone | 190 |
| 4-(1,1,3-trimethyl-2-cyclohexen-2-yl)-4-acetylmercapto-butanone-2 | 5 |

The addition of each of the three mixtures results in a marked improvement of the aroma in that a pronounced natural note of fresh raspberries is imparted to the composition.

EXAMPLE C

To an odorant composition of the rose type consisting of

| | |
|---|---|
| C—9 aldehyde (1% in phthalic acid diethyl ester) | 10 g |
| phenylacetaldehyde (10% in phthalic acid diethyl ester) | 10 g |
| Lilial (Givaudan) | 10 g |
| cinnamyl alcohol ex styrax | 10 g |
| geranium oil bourbon | 10 g |
| phenylethyl acetate | 20 g |
| Laurine (Givaudan) | 30 g |
| linalool | 70 g |
| Baccartol (Givaudan) | 150 g |
| phenylethyl alcohol extra | 300 g | there are added 30–50 g of a 10 percent solution of α-ionone, 4-(1,1,3-trimethyl-3-cyclohexen-2-yl)-4-mercapto-butanone-2 and 4-(1,1,3-trimethyl-3-cyclohexen-2-yl)-4-acetylmetrapto butanone-2 in the proportion 75:23:2.

This addition has a rounding-off action and imparts a natural fullness to the composition.

EXAMPLE D

A sugar syrup consisting of

| | |
|---|---|
| saccharose | 30% |
| citric acid | 1% |
| raspberry juice concentrate | 20% |
| water | 49% | is treated with 0.1 percent of one of mixtures (1), (2) and (3) described in Example B. This aromatised sugar syrup is diluted with a five-fold amount of water and the resulting drink is carbonated with three volumes of carbon dioxide. The sparkling drink thus obtained has a fruity-raspberry flavour which is immediately reminiscent of freshly crushed raspberries.

EXAMPLE E

To a raspberry aroma composition consisting of

| | parts by weight |
|---|---|
| α-irone | 20 |
| vanillin | 200 |
| p-hydroxyphenyl-butan-2-one (raspberry ketone) | 500 |
| maltol | 200 |
| formic acid | 150 |
| acetic acid | 150 |

-Continued

|  | parts by weight |
|---|---|
| acetic acid butyl ester | 1 |
| acetic acid ethyl ester | 0.5 |
| dimethyl sulphide | 1 |
| benzyl alcohol | 200 |
| menthone | 1 |
| C—14 aldehyde | 10 |
| C—16 aldehyde | 35 |
| raspberry distillate | 200 |
| isobutyric acid maltyl ester | 40 |
| anthranilic acid methyl ester | 0.5 |
| tiglic acid benzyl ester | 0.5 | there is added one of the following mixtures:
1) 4-(1,1,3-trimethyl-3-
    -cyclohexen-2-yl)-4-mercapto-
    butanone-2                                         1.80
   4-(1,1,3-trimethyl-3-
    -cyclohexen-2-yl)-4-acetyl-
    mercapto butanone-2                                0.18
   β-ionone                                            200
2) 4-(1,1,3,6-tetramethyl-3-cyclo-
    hexen-2-yl)-4-mercapto-butanone-2                  2
   α-irone                                             200
3) 4-(1,1,3,6-tetramethyl-2-cyclo-
    hexen-2-yl)-4-mercapto-butanone-2                  1
   β-irone                                             201

This addition results in a marked improvement of the aroma in that the natural note of fresh raspberries is imparted to the composition.

EXAMPLE F

To a raspberry aroma composition consisting of

|  | parts by weight |
|---|---|
| α-irone | 20 |
| vanillin | 200 |
| p-hydroxyphenyl-butan-2-one (raspberry ketone) | 500 |
| maltol | 200 |
| formic acid | 150 |
| acetic acid | 150 |
| acetic acid butyl ester | 1 |
| acetic acid ethyl ester | 0.5 |
| dimethyl sulphide | 1 |
| benzyl alcohol | 200 |
| menthone | 1 |
| C—14 aldehyde | 10 |
| C—16 aldehyde | 35 |
| raspberry distillate | 200 |
| isobutyric acid maltyl ester | 40 |
| anthranilic acid methyl ester | 0.5 |
| tiglic acid benzyl ester | 0.5 | there are added:
4-(1,1-dimethyl-3-methylene-
cyclohex-2-yl)-4-mercapto-
butanone-2                                              1.84
α-ionone                                                200

This addition results in a marked improvement of the aroma in that the natural note of fresh raspberries is imparted to the composition.

We claim:
1. Ionone and irone derivatives of the general formula

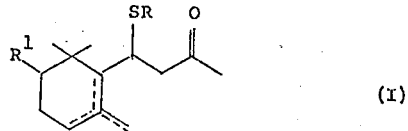

(I)

wherein R represents the acetyl group and $R^1$ represents a hydrogen atom or the methyl group and wherein the broken lines denote a double bond which is present in one of the three indicated positions.

2. 4-(1,1,3-trimethyl-3-cyclohexen-2-yl)-4-acetylmercapto-butanone-2.

* * * * *